United States Patent [19]

Oshizawa et al.

[11] Patent Number: 4,711,211
[45] Date of Patent: Dec. 8, 1987

[54] FUEL INJECTION APPARATUS FOR INTERNAL COMBUSTION ENGINE

[75] Inventors: Hidekazu Oshizawa; Kenji Okamoto, both of Higashimatsuyama, Japan

[73] Assignee: Diesel Kiki Co., Ltd.

[21] Appl. No.: 883,294

[22] Filed: Jul. 7, 1986

Related U.S. Application Data

[63] Continuation of Ser. No. 692,391, Jan. 17, 1985, abandoned.

[30] Foreign Application Priority Data

Jan. 19, 1984 [JP] Japan .................. 59-6351

[51] Int. Cl.⁴ ............................ F02M 39/00
[52] U.S. Cl. .................. 123/357; 123/358; 123/501
[58] Field of Search ........... 123/357, 358, 359, 502, 123/501, 500

[56] References Cited

U.S. PATENT DOCUMENTS

| | | | |
|---|---|---|---|
| 4,476,832 | 10/1984 | Fujimori | 123/502 |
| 4,476,837 | 10/1984 | Salzgeber | 123/501 |
| 4,492,196 | 1/1985 | Oshizawa | 123/357 |
| 4,493,302 | 1/1985 | Kawamura | 123/502 |
| 4,502,439 | 3/1985 | Nagase | 123/357 |

FOREIGN PATENT DOCUMENTS

| | | | |
|---|---|---|---|
| 0008222 | 1/1979 | Japan | 123/358 |
| 0075929 | 6/1981 | Japan | 123/357 |
| 0005523 | 1/1982 | Japan | 123/357 |

Primary Examiner—Carl Stuart Miller
Attorney, Agent, or Firm—Guy W. Shoup

[57] ABSTRACT

In a fuel injection apparatus for an internal combustion engine in which the fuel injection timing and the amount of fuel injection are controlled in response to a signal indicative of the operating condition of the engine, the maximum amount of fuel injection is determined in such a way that the amount of smoke produced at the maximum fuel injection is equal to a predetermined limit value even when the fuel injection timing is adjusted in accordance with the operating condition of the engine.

4 Claims, 4 Drawing Figures

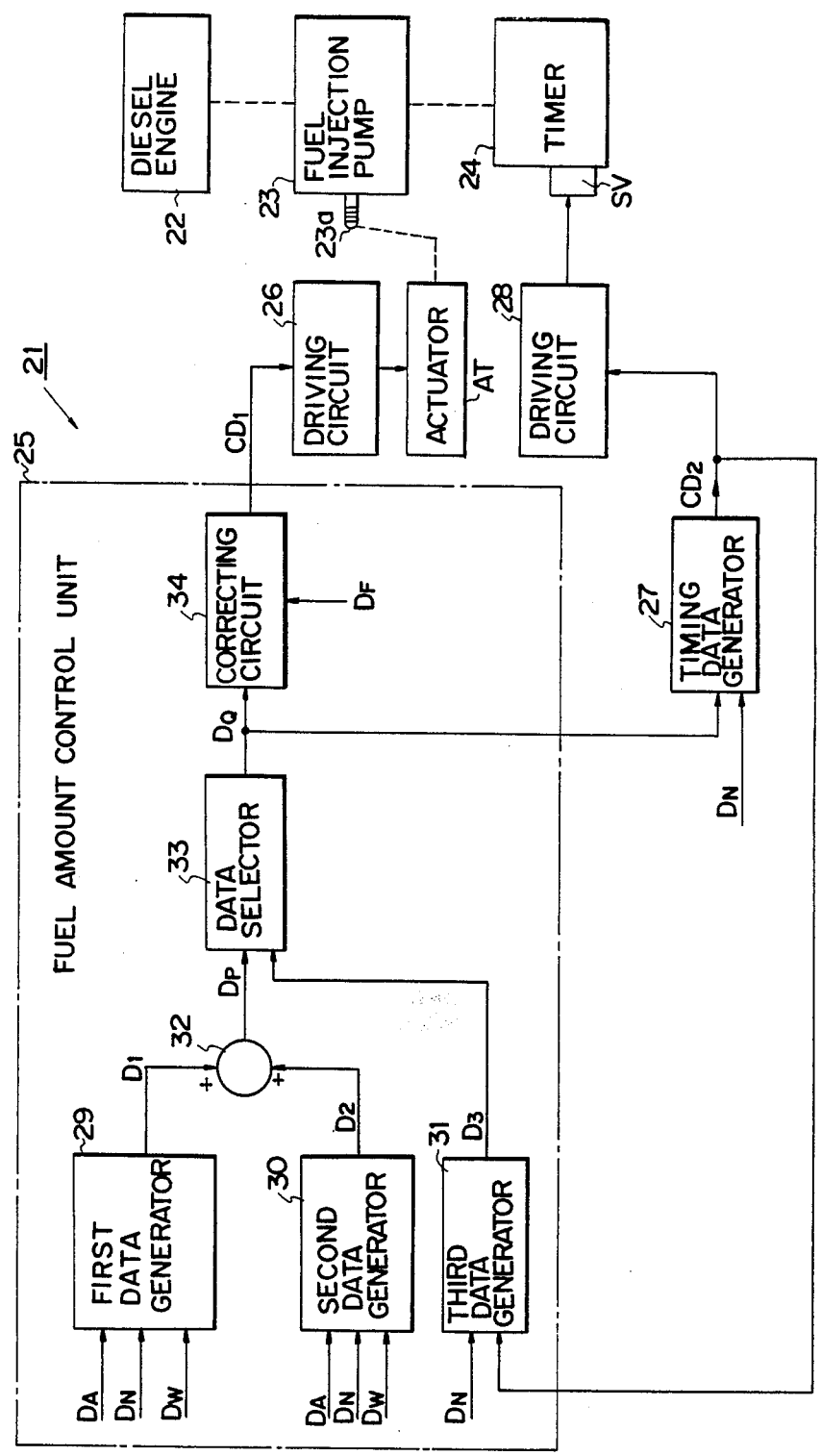

FUEL INJECTION APPARATUS FOR INTERNAL COMBUSTION ENGINE

This is a continuation application from application Ser. No. 692,391 filed Jan. 17, 1985 now abandoned.

BACKGROUND OF THE INVENTION

1. Field of the Invention

The present invention relates to a fuel injection apparatus for internal combustion engines, and more particularly to a fuel injection apparatus in which maximum fuel injection can be adjusted in accordance with the fuel injection advance.

2. Description of the Prior Art

The control of the amount of fuel injection, especially the control of the maximum amount of fuel injection, of the conventional fuel injection apparatus for internal combustion engines is generally determined on the basis of the rotational speed of the internal combustion engine. However, in Japanese Utility Model Public Disclosure No. 136138/81, there is proposed an apparatus in which the maximum amount of fuel injection is controlled depending upon whether or not the apparatus is in the state that free-acceleration is possible. On the other hand, in controlling the timing of fuel injection, not only the rotational speed of the engine, but also the acceleration of the engine, the coolant temperature, the engine load and the like are generally taken into consideration (e.g., Japanese Patent Publication No. 39285/76).

The control of fuel injection timing in the conventional fuel injection apparatus has a large effect on the smoke limit characteristic of the internal combustion engine, in other words, on the limit characteristic defined by a predetermined limit value for the amount of smoke produced. That is, when the timing of fuel injection varies within a predetermined adjustment range, even if the engine speed and the amount of fuel injection are not changed, the amount of smoke in the exhaust gas varies. Therefore, a fuel injection apparatus constituted by a combination of the prior art apparatuses described above has a disadvantage in that, even when the engine speed is maintained constant, an amount of smoke exceeding a predetermined value is sometimes produced depending upon the fuel injection timing. This is especially true under engine operation under the maximum amount of fuel injection.

One way for overcoming this disadvantage is to set the maximum fuel injection at a relatively low level over the required speed range in order to suppress the amount of smoke to a desired limit level under any condition of fuel injection timing adjustment whatever. However, in the case that the maximum fuel injection is set in this manner, there arises the disadvantage that the power of the engine is sometimes sacrificed.

SUMMARY OF THE INVENTION

It is an object of the invention to provide an improved fuel injection apparatus for internal combustion engines in which the smoke limit characteristic is not affected by adjustment of the fuel injection timing.

It is another object of the invention to provide a fuel injection apparatus for internal combustion engines in which maximum fuel injection is controlled in response to the adjustment of the fuel injection timing in such a way that the amount of smoke does not exceed the predetermined limit level even if the fuel injection timing is adjusted.

According to the present invention, in a fuel injection apparatus for an internal combustion engine in which the fuel injection timing and the amount of fuel injection are controlled in response to at least one condition signal indicating the operating condition of the engine, the apparatus has a first control means for controlling the fuel injection timing in response to the condition signal, and a second control means for controlling the amount of fuel injection in response to the condition signal and timing data concerning the fuel injection timing set by said first control means. The second control means is provided with a first means for producing first fuel injection data for setting the maximum fuel injection at each instant in such a way that the amount of smoke produced at maximum fuel injection is equal to the predetermined limit value even when the fuel injection timing is adjusted by the first control means.

In this case, data showing the actual fuel injection timing or the target fuel injection timing may be used as the data concerning the fuel injection timing used for determining the maximum fuel injection.

With this invention, the maximum fuel injection is controlled in accordance with not only the engine speed but also the fuel injection timing, whereby the maximum fuel injection is set in such way that the amount of smoke produced at any maximum amount of fuel injected is suppressed to a predetermined value even when the fuel injection timing is adjusted. As a result, the production of smoke is effectively suppressed without disadvantageous suppression of the output power of the engine.

The present invention will be better understood and the other objects and advantages thereof will be more apparent from the following detailed description of preferred embodiments with reference to the accompanying drawings.

BRIEF DESCRIPTION OF THE DRAWINGS

FIG. 4 is a block diagram of another embodiment of a fuel injection apparatus of the present invention.

DESCRIPTION OF THE PREFERRED EMBODIMENTS

Figure 1:
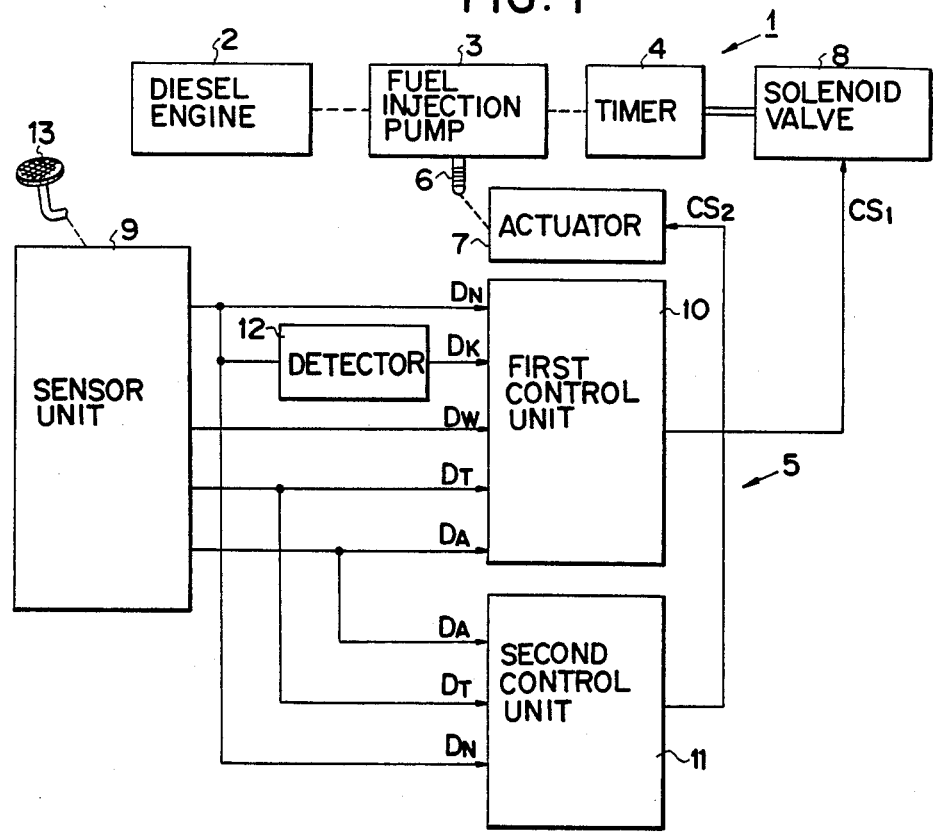
FIG. 1 is a block diagram of an embodiment of the fuel injection apparatus of the present invention.

FIG. 1 shows an embodiment of a fuel injection apparatus of the present invention. A fuel injection apparatus 1 has a fuel injection pump 3 for injecting fuel into a diesel engine 2, and a timer 4 for adjusting the fuel injection timing of the fuel injection pump 3. The fuel injection pump 3 has a control rack 6, which is a fuel adjusting member and is positionally controlled by an actuator 7. The timer 4 has a solenoid valve 8 driven by an electric signal and the adjustment of the fuel injection timing by the timer 4 is carried out by the operation of the solenoid valve 8.

For driving the actuator 7 and the solenoid valve 8 in order to adjust the amount and timing of fuel injection, there is provided a control device 5, which comprises a sensor unit 9, a first control unit 10 and a second control unit 11. From sensors (not shown) in the sensor unit 9, data $D_N$ showing the rotational speed of the diesel engine 2, data $D_W$ showing the temperature of the engine coolant, data $D_T$ showing the actual fuel injection timing and data $D_A$ showing the amount of operation of an accelerator pedal 13 are output. Since the sensor unit 9 for generating these data can be easily constituted by the use of conventional sensors well known in the prior art, no explanation of the detailed structure thereof will be given here. The data $D_N$ is input to a detector 12, in which the acceleration of the diesel engine 2 is computed on the basis of data $D_N$ and the computed result is output as data $D_K$ showing the acceleration of the diesel engine 2 at each instant.

Data $D_N$, $D_K$, $D_W$, $D_T$ and $D_A$ are input to the first control unit 10, in which the optimum fuel injection timing for the operating condition of the diesel engine 2 at each instant is computed on the basis of the input data, and a first control signal $CS_1$ is produced for driving the solenoid valve 8 in such a way that the actual fuel injection timing shown by data $D_T$ is made coincident with the computed optimum fuel injection timing.

Figure 2:
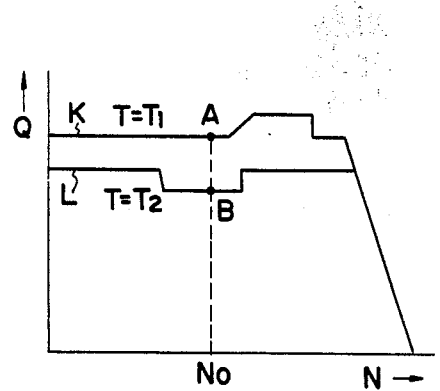
FIGS. 2 and 3 are graphs showing characteristic curves used for explanation of the operation of the apparatus shown in FIG. 1.

On the other hand, data $D_A$, $D_T$ and $D_N$ are applied to the second control unit 11, in which a computation for positioning the control rack 6 is carried out in order to control the rotational speed of the diesel engine 2 in accordance with a predetermined governor characteristic curve as shown in FIG. 2, and a second control signal $CS_2$ for driving the actuator 7 is produced in accordance with the result of the computation. In the second control unit 11, the partial load is computed as a function of the rotational speed of the diesel engine 2 and the amount of operation of the accelerator pedal 13, while the maximum fuel injection is computed as a function of the rotational speed of the diesel engine 2 and the fuel injection timing at each instant.

In this embodiment, as will be understood from the above description, the fuel injection timing is controlled by a closed-loop control system in which the difference between a target injection timing computed as the optimum timing and the actual timing is fed back.

As mentioned above, the smoke limit characteristic generally changes with adjustment of the actual timing of the fuel injection of the diesel engine 2. In accordance with this invention, however, it is possible to set the maximum amount of fuel injected at each instant in such a way that the amount of the smoke is suppressed to the predetermined limit value at any maximum amount of fuel injected even when the fuel injection timing is changed by adjustment of the injection timing of the fuel. For this data showing the relationship between the fuel injection timing and the amount of fuel injected when the exhausted smoke reaches a predetermined value is experimentally obtained in advance and stored in the second control unit 11. For correcting the maximum amount of fuel injected by the use of the data stored in the second control unit 11 in such a way that the amount of smoke produced at any maximum amount of fuel injected becomes the predetermined limit value, data $D_T$ is input to the second control unit 11. In the second control unit 11, the maximum amount of fuel injected is set in response to data $D_T$ in such a way that the amount of smoke produced at any maximum amount of fuel injected is suppressed to the predetermined limit value without pronounced reduction of power output.

Figure 3:
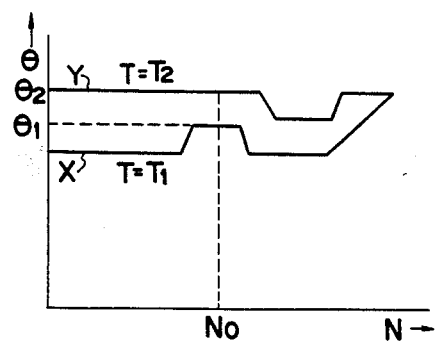

The operation of the apparatus shown in FIG. 1 will be now described with reference to FIGS. 2 and 3. FIG. 3 shows a characteristic curve of the relationship between the timing $\theta$ of fuel injection and the speed N of the diesel engine 2. In FIG. 3, $\theta$ indicates the injection advance angle, and curve X indicates the fuel injection timing characteristic when the coolant temperature T is $T_1$ and the curve Y indicates the same characteristic when the coolant temperature T is $T_2$. It will be understood from FIG. 3 that the timing $\theta$ varies even if the engine speed N does not change when some other operating condition of the diesel engine 2 changes. For example, when the coolant temperature T changes from $T_1$ to $T_2$ with the engine speed N kept at $N_0$, as shown in FIG. 3, the timing $\theta$ is changed from $\theta_1$ to $\theta_2$. The change in the timing $\theta$ has an effect on the amount of smoke produced in the exhaust gas.

In this apparatus 1, in order to prevent production of more than a predetermined limit level of smoke over the entire speed range at any maximum amount of fuel injected even if the fuel injection timing is changed due to a change in the operating condition of the engine at any engine speed N, the second control unit 11 is so arranged that the maximum fuel injection is corrected in response to data $D_T$. This correction is performed, for example, such that, as shown in FIG. 2, the characteristic curve K of maximum fuel injection at $T = T_1$ is changed to the characteristic curve L when the coolant temperature T changes from $T_1$ to $T_2$. The correction of the maximum amount of fuel injected shown in FIG. 3 is only one example and the form of the corrected curves may vary depending upon the characteristics of the injection pump, the diesel engine and the like.

As described above, in the second control unit 11, the maximum fuel injection is determined taking account of the change in the smoke limit characteristic due to the change in the timing $\theta$, so that the amount of smoke produced at any maximum amount of fuel injected is suppressed to the predetermined limit level regardless of the adjustment of the fuel injection timing, whereby optimum control of the maximum fuel injection with consideration to the smoke limit characteristic can be performed. As a result, as shown for example in FIG. 2 illustrating the relationship between the amount Q of fuel injected and engine speed N, the amount of smoke for maximum fuel injection at $N = N_0$ and $T = T_1$ (i.e., at the operation point A) is equal to that for maximum fuel injection at $N = N_0$ and $T = T_1$ (i.e., at the operating point B).

With this structure, the amount of smoke produced in the exhaust gas at any maximum fuel injection can be suppressed to a desired limit level, regardless of any adjustment of the fuel injection timing. Consequently, excellent engine control can be realized and the apparatus makes a major contribution to the suppression of air pollution.

FIG. 4 shows another embodiment of the present invention, in which the structure is more concretely illustrated. A fuel injection apparatus 21 has a fuel injection pump 23 for supplying fuel to a diesel engine 22, and a timer 24 for adjusting the timing of fuel injection by the fuel injection pump 23. A control rack $23_a$ of the fuel injection pump 23 is connected with an actuator AT controlled by a driving circuit 26 which is operated in response to control data $CD_1$ from a fuel amount control unit 25. The timer 24 has a solenoid valve SV for controlling a hydraulic pressure supplied for an advance angle adjusting member (not shown) in the timer 24 and the solenoid valve SV is controlled by a driving circuit 28 which is operated in response to control data $CD_2$ produced by a timing data generator 27.

The fuel amount control unit 25 corresponds to the second control unit 11 in FIG. 1 and comprises a first data generator 29 for generating idle data $D_1$ concerning the idling characteristic portion of a predetermined governor characteristic curve, a second data generator 30 for generating partial load data $D_2$ concerning the partial load characteristic and a third data generator 31 for generating full Q data $D_3$ concerning the maximum fuel injection. Data $D_A$, $D_N$ and $D_W$ which are of the same nature as those described with respect to FIG. 1, are applied from a sensor unit (not shown) to the first and second data generators 29 and 30, and the idle data $D_1$ and partial load data $D_2$ are generated from the first and second data generators 29 and 30, respectively. Idle data $D_1$ and partial data $D_2$ are added together with by an adder 32 and the resulting data $D_P$ is applied to a data selector 33.

Data $D_N$ showing the rotational speed of the diesel engine 22 and the control data $CD_2$ generated from the timing data generator 27 are input to the third data generator 31. In the embodiment shown in FIG. 4, the fuel injection timing is controlled in the open-loop control mode by the use of the control data $CD_2$, with the control data $CD_2$ being used as target data indicative of the optimum fuel injection timing corresponding to the operating condition of the diesel engine 22 at each instant.

The full Q data $D_3$ determining the maximum fuel injection is computed in the third data generator 31 on the basis of data $D_N$ and $CD_2$. The computation of the full Q data $D_3$ in the third data generator 31 is performed in such a way that the maximum fuel injection characteristic by which the amount of smoke produced by the engine operation at any maximum amount of fuel injected is suppressed to a predetermined level regardless of the adjustment of the fuel injection timing by the timer 4.

Such a computation of the full Q data $D_3$ can easily be realized by a so-called map calculation using a ROM in which a number of data obtained experimentally and indicating the relationship among the engine speed, the advance angle of the fuel injection the amount of smoke and the amount of fuel injected, are stored in advance at respective addresses. The map or table stored in the ROM may be adapted to enable read-out of the amount of fuel injected at which the predetermined level of smoke is produced by applying thereto the data $D_N$ and $CD_2$ as address data and the result of the computation in the ROM is derived therefrom as data indicating the maximum amount of fuel injected at each instant.

The full Q data $D_3$ is also applied to the data selector 33 which selects the smaller of the two input data and outputs the selected data as fuel amount data $D_Q$. As a result, when data $D_P$ is larger than data $D_3$, the data $D_P$ is not derived from the data selector 33 as the fuel amount data $D_Q$, so that the maximum amount of fuel injected never exceeds the amount determined by data $D_3$. The fuel amount data D is input to a correcting circuit 34 in which it is corrected in accordance with data $D_F$ showing the fuel temperature, and the fuel amount data $D_Q$ corrected by the correcting circuit 34 is output as the control data $CD_1$ The fuel amount data $D_Q$ and data $D_N$ are input to the timing data generator 27 which is also constituted by the use of ROM so as to carry out a map calculation similar to the third data generator 31 and to compute control data $CD_2$ showing a target fuel injection timing.

In the fuel injection apparatus shown in FIG. 4, since the fuel injection timing is controlled in an openloop control mode by the use of the data $CD_2$, as with the apparatus shown in FIG. 1, the amount of smoke at maximum fuel injection can always be maintained at the same level insofar as the engine speed is the same.

We claim:

1. A fuel injection apparatus for an internal combustion engine in which the fuel injection timing and the amount of fuel injection are controlled in response to at least one condition signal indicating the operating condition of the engine, comprising:

a first control means responsive to the condition signal for calculating and outputting a target timing data representing an optimum timing of fuel injection;

a timer means responsive to the target timing data for adjusting the fuel injection timing so as to obtain the optimum timing;

a data producing means responsive to the condition signal for producing a quantity data representing the amount of fuel injection required for the operating condition of the engine;

a second control means responsive to a signal indicating an engine speed at each instant and to the target timing data for calculating and outputting a full amount data indicating a maximum fuel injection quantity for the operating condition of the engine at each instant which is determined so that the amount of smoke produced at the maximum fuel injection quantity determined by the full amount data is a predetermined upper limit;

a selecting means responsive to the quantity data and the full amount data for selecting the lesser of the two data; and actuator means responsive to an output of said selecting means for controlling the fuel injection quantity, whereby the amount of smoke produced by the fuel injection quantity does not exceed the predetermined upper limit during each adjustment of the fuel injection timing by said first control means and said timer means and a full power condition can be obtained with a minimum of smoke irrespective of changes in the fuel injection timing.

2. A fuel injection apparatus for an internal combustion engine as claimed in claim 1 wherein the fuel injection timing is controlled in the closed-loop control mode in said first control means.

3. A fuel injection apparatus for an internal combustion engine as claimed in claim 2 wherein said first control means operates in response to an actual timing signal indicative of the actual fuel injection timing.

4. A fuel injection apparatus for an internal combustion engine as claimed in claim 1 wherein the fuel injection timing is controlled in the open-loop control mode in said first control means.

* * * * *